United States Patent [19]
Harris et al.

[11] Patent Number: 5,247,727
[45] Date of Patent: Sep. 28, 1993

[54] CERAMIC MEMBRANE REMOVAL TOOL

[75] Inventors: John G. Harris, Preston; Willard K. Moon, Groton, both of Conn.

[73] Assignee: Pfizer Inc., New York, N.Y.

[21] Appl. No.: 918,867

[22] Filed: Jul. 22, 1992

[51] Int. Cl.⁵ .............................. B23P 19/04
[52] U.S. Cl. ...................................... 29/259
[58] Field of Search ........................... 29/258-266

[56] References Cited

U.S. PATENT DOCUMENTS

| | | | |
|---|---|---|---|
| 3,689,978 | 9/1972 | Kelso | 29/259 |
| 4,372,024 | 2/1983 | Shevada | 29/260 |
| 4,771,528 | 9/1988 | Stromberg | 29/259 |

Primary Examiner—Robert C. Watson
Attorney, Agent, or Firm—Peter C. Richardson; Gregg C. Benson; A. Dean Olson

[57] ABSTRACT

A tool for removing filter membranes from a filter housing without breaking the membranes. The tool comprises a threaded screw means (27) for pressing the membrane (60) though holes in opposing sides of the housing (48) and a guide means (21) for maintaining the screw means (27) in alignment with the holes. The guide means (21) has a threaded hole for receiving the threaded screw means (27) therethrough. The guide means (21) is slidably retained along a beam (3) and disposed between removable fastening means (9, 12) used to clamp the tool to the filter housing (48).

6 Claims, 3 Drawing Sheets

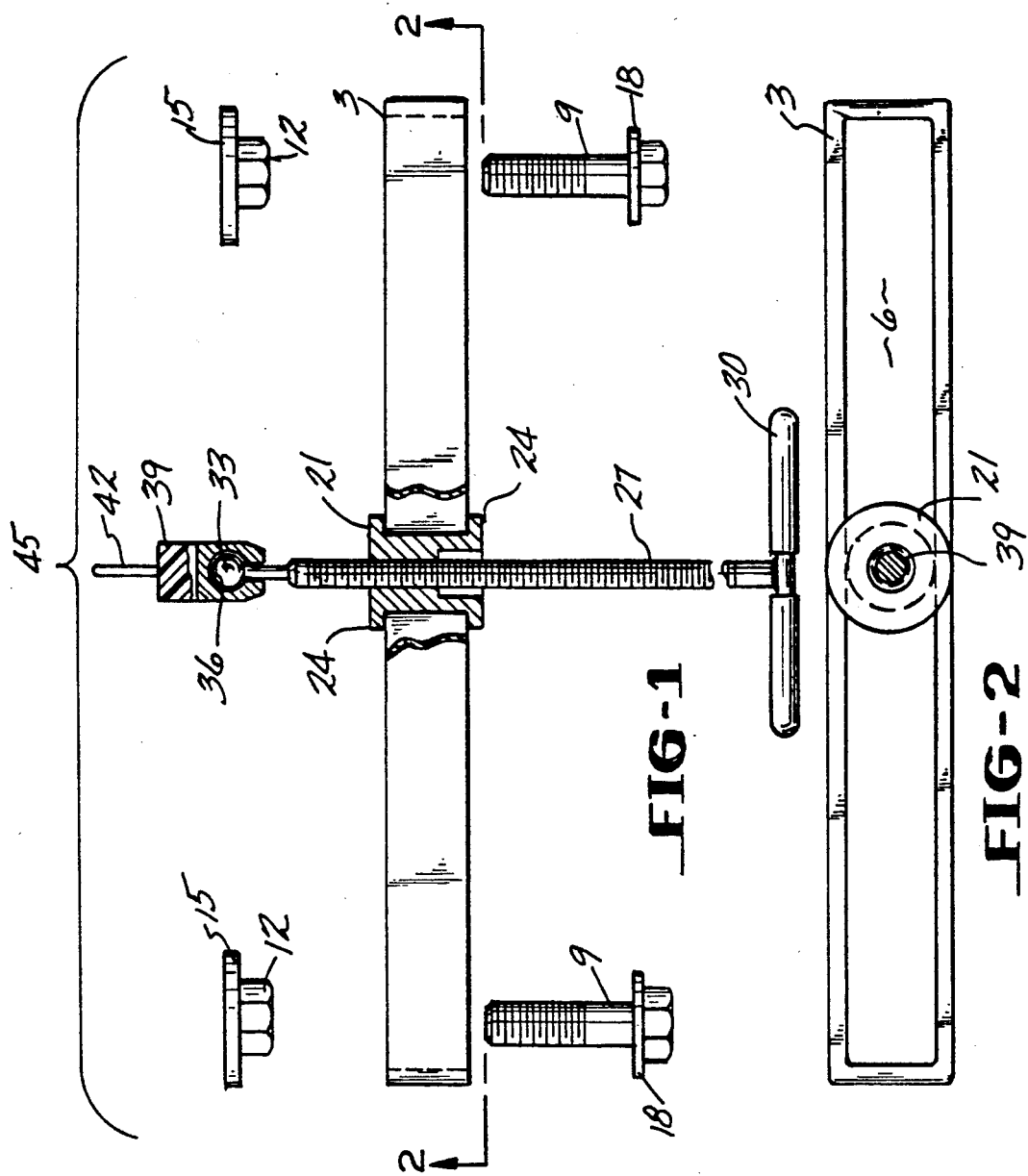

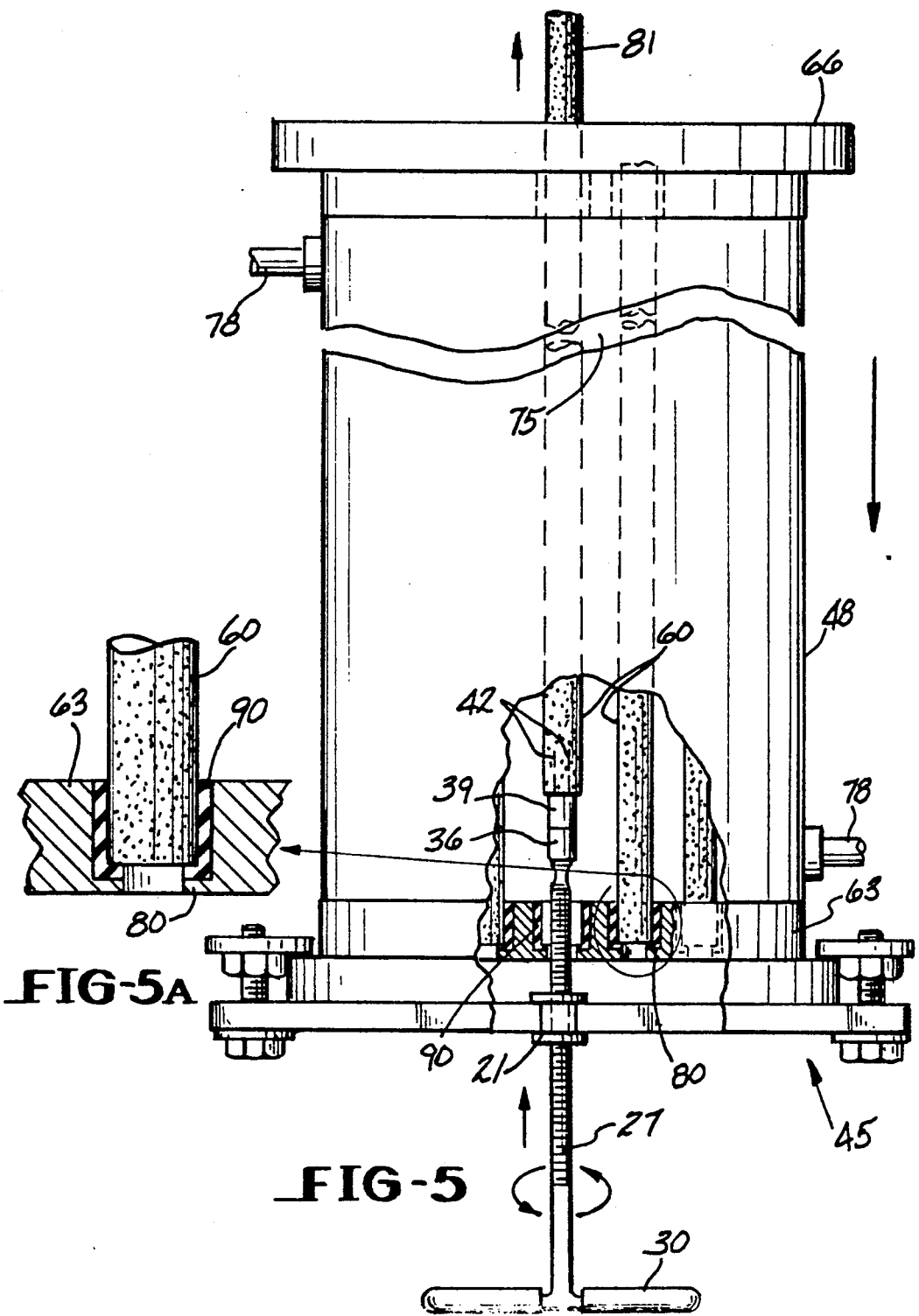

CERAMIC MEMBRANE REMOVAL TOOL

BACKGROUND OF THE INVENTION

This invention relates to removal tools and more particularly tools for removing filter membranes from housings.

Ceramic membrane ultrafiltration has been used for a number of years in the laboratory to purify materials. Recently ceramic membrane ultrafiltration has been adapted for the purification of large quantities of compounds in chemical processing plants. Because of the large scales involved the ultrafiltration apparatuses are different in configuration from laboratory ultrafiltration systems. One type of large-scale ultrafiltration apparatus comprises a canister housing including a plurality of parallel running filter membranes. The membranes pass through holes at the inlet and outlet of the empty canister. Rubber grommets fitted to the membranes at the canister holes provide an extremely secure fit. The solution or suspension to be filtered cycles repeatedly through bores in the filter membrane. The permeate is filtered through the porous ceramic membrane into the canister housing interior and exits the canister housing interior through additional outlets. Typically provision is made for cleaning the ceramic membranes through these additional outlets by backflushing.

During use the membranes tend to become "locked" in place. In fact, because the membranes are typically made of a brittle ceramic, it can be difficult to remove the membranes from the canister without breaking them. One removal technique utilizes a hammer and polypropylene pin to drive the membrane through the holes. However, typically this results in a broken membrane.

Because these membranes are expensive there is a continuing search in this field of art for devices for successfully removing membranes from filter housings.

SUMMARY OF THE INVENTION

This invention is directed to a tool for removing membranes from a filter housing without breaking the membranes during removal. The tool comprises a threaded screw means for pressing the membrane through aligned housing holes in opposing sides of the filter housing and a guide means for maintaining the screw means substantially aligned with the filter housing holes. The guide means has a threaded hole for receiving the threaded screw means therethrough. The tool also comprises a beam and a pair of removable fastening means for clamping the tool to the filter housing. The pair of fastening means are slidably retained along the beam. The guide means is slidably retained along the beam and disposed between the fastening means.

Other features and advantages will be apparent from the specification and claims and from the accompanying drawing which illustrate embodiments of the invention.

BRIEF DESCRIPTION OF THE DRAWINGS

FIG. 1 is a side view of the removal tool partly broken away to illustrate the guide mechanism and ball and socket swivel joint.

FIG. 2 is a sectional view taken along line 2—2 of FIG. 1 with the fastening means removed for clarity.

FIG. 5 is a side view of the filter housing and attached removal tool partly broken away and partly in phantom to illustrate the removal of a membrane from the housing.

FIG. 5A is an expanded view of the filter housing view in FIG. 5 that is broken away.

DETAILED DESCRIPTION OF THE INVENTION

Figure 4:
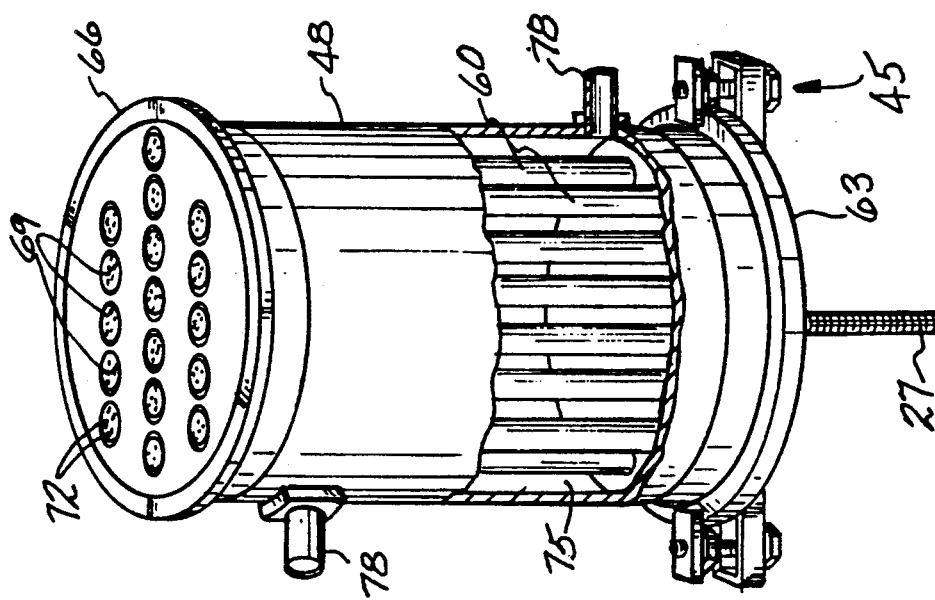
FIG. 4 is a perspective view of the filter housing and attached removal tool partly broken away to illustrate the parallel membranes passing through the housing.

A clearer understanding of the invention may be had by reference to the Figures. According to FIGS. 1 and 2 a beam 3 has a slot 6 and a pair of fastening means (e.g. bolts 9 and nuts 12) extending through the slot 6. Typically the nuts 12 have plates 15 attached thereto and extending radially outward therefrom. The plates 15 facilitate attachment to the filter housing. The bolts 9 have a head 18 or washer sized so that the bolt 9 cannot pass completely through the beam slot 6 (e.g. the bolt head has a larger diameter than the slot width). Thus, when joined on opposing sides of the beam 3 the bolts 9 and nuts 12 are slidably retained along the beam slot 6.

A guide means such as a spool 21 extends through the beam slot 6 and is slidably retained along the beam slot by the spool ends 24 which extend radially outward from the spool 21 and have a larger diameter than the beam slot 6. The guide means is disposed between the fastening means. Typically, the length of the spool 21 between the ends 234 is only slightly larger than the thickness of the beam 3 in order to facilitate the spool's 21 guidance function. In addition the spool 21 has a threaded hole extending therethrough.

A screw means such as a threaded shaft 27 having a handle 30 attached thereto is screwed through the threaded spool 21. Thus the spool 21 guides the threaded shaft 27 in the desired direction. Extending from the threaded shaft 27 on the opposing side of the beam 3 from the handle 30 is a ball 33. A socket 36 encloses the ball 33 to form a freely rotatable ball and socket swivel joint. Extending from the socket 36 is a cushioned end 39 (e.g. polytetrafluoroethylene end). Extending from the cushioned end 39 is a pin 42 (typically a pair of pins). Thus the socket 36, cushioned end 39 and pin 42 form a unified structure.

The beam 3, bolts 9 and nuts 12, spool 21, threaded shaft 27, and freely rotatable socket 36 - pin 42 structure form an exemplary removal tool 45 of this invention.

Figure 3:
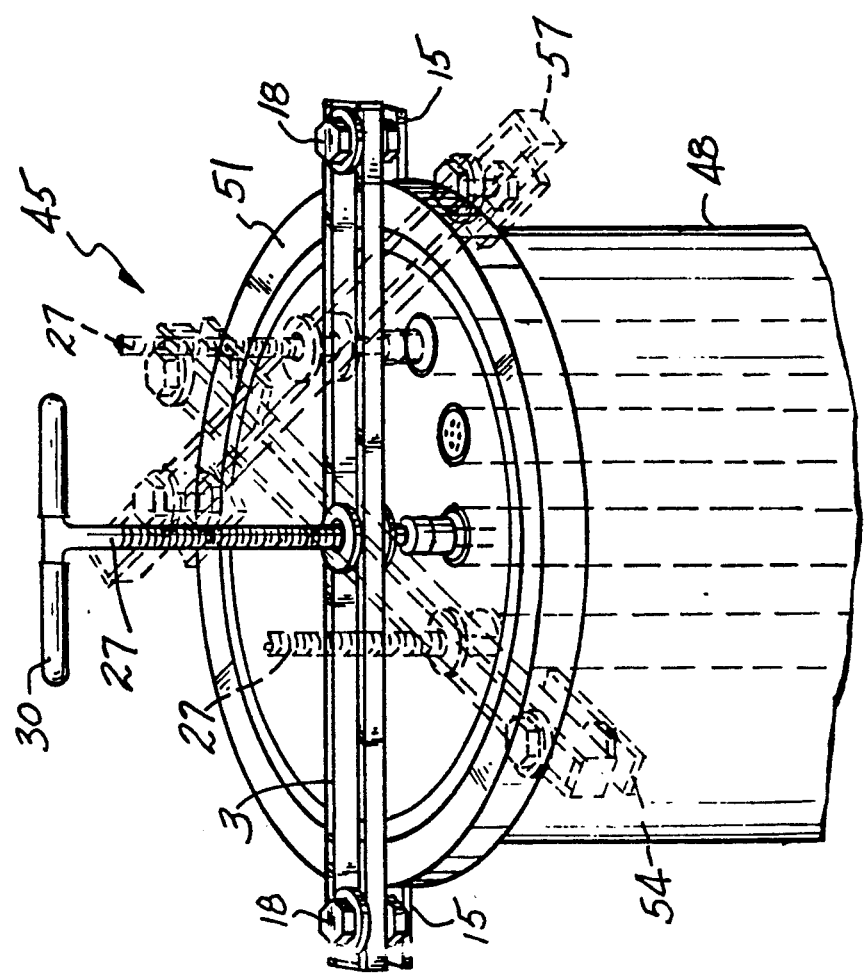
FIG. 3 is a perspective view of the attachment of the removal tool to the housing showing alternate attachment configuration in phantom.

FIG. 3 illustrates the attachment of the removal tool 45 to the filter housing 48. The cylindrical filter housing 48 has a lip 51 extending therefrom and the removal tool 45 clamps to the lip 51 of filter housing 48. The slotted beam 3 lays across the filter housing lip 51. The nut plates 15 extend underneath the filter housing lip 51 and on the opposing side of the lip 51 from the slotted beam 3. The bolt heads 18 are on the side of the beam 3 opposite to the nut plate 15. The bolts extend through the slotted beam 3 and are fastened to the nut plates 15, thus clamping the removal tool to the filter housing lip 51. The threaded shaft 27 and spool 21 are free to slide along the beam 3 in order to facilitate positioning of the shaft 27 directly over the desired position. In addition, in order to facilitate positioning of the shaft 27 over the desired position, FIG. 3 illustrates phantom removal tools 54, 57 configured in alternative positions relative to the filter housing lip 51. For example, phantom removal tool (57) illustrates an embodiment where the removal tool 57 does not cross the center. The freedom of movement of the fastening means along the beam 3 facilitates the above embodiment.

According to FIG. 4 the removal tool 45 is clamped to the filter housing 48. The filter housing is partly broken away to show a plurality of membranes (i.e. filters) 60 that extend in parallel fashion through the open filter housing 48 from the inlet 66 to the outlet 63 of the housing 48. The membranes 60 are typically made of a brittle ceramic material. The membranes 60 are held in holes 69 in the housing inlet 66 by flexible grommets (e.g. rubber) to form an interference fit. In an analogous fashion the membranes 60 are secured in corresponding holes in the housing outlet 63 by additional grommets. The membranes are also retained from movement in the fluid flow direction (i.e., inlet 66 to outlet 63) by housing retaining rings 80 against which the membranes 60 are seated. The membranes 60 have a plurality of bores 72 that run the length of the membranes 60.

According to FIGS. 5 and 5A the removal tool 45 is clamped to the outlet 63 side of the filter housing 48. The filter housing 48 is partly broken away at the outlet 63 to illustrate the abutting of the cushioned tip 39 of the shaft 27 to the membrane 60 and thus the removal of the membrane 60 from the housing 48. The shaft 27 and thus cushioned tip 39 are in alignment with the membrane in need of removal. The handle 30 is rotated to thread the shaft 27 through the guide spool 21, rubber grommet 90 and housing retaining ring 80 resulting in the upward movement of the cushioned tip 39. The pins 42 are aligned with and extend into the membrane bores 72 to facilitate maintenance of a steady linear pressure in order to avoid the membranes cocking at an angle once the membrane 60 clears the outlet 63 of the filter housing 48. The ball and socket swivel joint allows free rotation of the cushioned lip 39 relative to the threaded shaft 27 so that the cushioned tip 39 does not cause the membrane 60 to twist and potentially cause membrane 60 breakage. Once the membrane 60 has been pushed a convenient distance from filter housing top 66 it may be manually removed without breakage.

In this particular filter housing 48 the fluid flow direction is from inlet 66 to outlet 63. The filter housing may be disposed in-line in conventional chemical processing equipment. The fluid to be filtered flows through the membrane bores 72, laterally through ceramic membrane pores 81 into the housing interior 75 and exits through additional housing outlets 78. A pair of outlets 78 provides provision for cleaning the ceramic membranes by backflushing. The ceramic membranes are selected to provide the desired pore size and thus filtration. Although, the tool's use has been illustrated in conjunction with a particular filter housing those skilled in the art could readily foresee its use with other membranes and filter housings.

Thus this invention makes a significant advance in the field of removal tools by providing a removal tool that provides a positive non-twisting aligned pressure to remove membranes without breakage. In addition, the removal tool accommodates a wide variety of filter housings and membrane positions.

It should be understood that the invention is not limited to the particular embodiments shown and described herein, but that various changes and modifications may be made without departing from the spirit and scope of this novel concept as defined by the following claims.

We claim:

1. A tool particularly adapted for removing a membrane filter from a filter housing comprising:
    a) a beam (3);
    b) threaded screw means (27) for pressing said filter through aligned holes in opposing sides of said filter housing;
    c) guide means (21) for maintaining said screw means (27) substantially aligned with said filter housing holes, said guide means (21) having a threaded hole therethrough;
    d) a pair of removable fastening means (9, 12) for clamping said tool (45) to said filter housing;
    e) said pair of fastening means (9, 12) slidably retained along said beam (3);
    f) said guide means (21) slidably retained along said beam (3) and disposed between said pair of fastening means (9, 12); and
    g) said screw means (27) threaded through said guide means (21).

2. The removal tool as recited in claim 1 wherein said screw means (27) has a freely rotatable end attached through a ball (33) and socket (36) swivel joint.

3. The removal tool as recited in claim 2 wherein said freely rotatable end has a pin (42) extending therefrom.

4. The removal tool as recited in claim 2 wherein said freely rotatable end has two pins extending therefrom.

5. A tool particularly adapted for removing a membrane filter from a filter housing comprising:
    a) a beam (3);
    b) threaded screw means (27) for pressing said filter through aligned holes in opposing sides of said filter housing;
    c) said screw means (27) having a freely rotatable end attached through a ball (33) and socket (36) swivel joint;
    d) said rotatable end having a pin (42) extending therefrom and said rotatable end having a cushioned end (39);
    e) guide means (21) for maintaining said screw means (27) substantially aligned with said filter housing holes, said guide means (21) having a threaded hole therethrough;
    f) a pair of removable fastening means (9, 12) for clamping said tool (45) to said filter housing;
    g) said pair of fastening means (9, 12) slidably retained along said beam (3);
    h) said guide means (21) slidably retained along said beam (3) and disposed between said fastening means (9, 12); and
    i) said screw means (27) threaded through said guide means (21).

6. A tool particularly adapted for removing a membrane filter from a filter housing comprising:
    a) a beam (3) having a slot (6) therethrough;
    b) a threaded screw means (27) for pressing said filter through aligned holes in opposing sides of said filter housing, said screw means (27) extending through said slot (6);
    c) said screw means (27) having a freely rotatable end attached through a ball (33) and socket (36) swivel joint;
    d) said rotatable end having a pin (42) extending therefrom and said rotatable end having a cushioned end (39);

e) guide means (21) for maintaining said screw means (27) substantially aligned with said filter housing holes, said guide means (21) having a threaded hole therethrough;

f) a pair of removable bolts (9, 12) for clamping said tool (45) to said filter housing, said bolts extending through said slot (6);

g) said pair of bolts (9, 12) slidably retained along said beam (3);

h) said guide means (21) slidably retained along said beam (3) and disposed between said bolts (9, 12); and i) said screw means (27) threaded through said guide means (21).

* * * * *